United States Patent
Seigneurbieux (10) Patent No.: US 8,564,669 B2
(45) Date of Patent: Oct. 22, 2013

(54) SYSTEM AND METHOD OF ANALYZING VIDEO STREAMS FOR DETECTING BLACK/SNOW OR FREEZE

(75) Inventor: Pierre Seigneurbieux, San Ramon, CA (US)

(73) Assignee: General Instrument Corporation, Horsham, PA (US)

( * ) Notice: Subject to any disclaimer, the term of this patent is extended or adjusted under 35 U.S.C. 154(b) by 524 days.

(21) Appl. No.: 12/512,980

(22) Filed: Jul. 30, 2009

(65) Prior Publication Data

US 2011/0025857 A1    Feb. 3, 2011

(51) Int. Cl.
*H04N 17/00* (2006.01)

(52) U.S. Cl.
USPC .......................................... 348/180

(58) Field of Classification Search
USPC .......... 348/192, 193, 180–182, 184–185, 559, 348/560; 282/100, 286, 236; 714/39–40
See application file for complete search history.

(56) References Cited

U.S. PATENT DOCUMENTS

| | | | |
|---|---|---|---|
| 4,364,080 A * | 12/1982 | Vidovic | 348/185 |
| 5,528,381 A | 6/1996 | Capizzo et al. | |
| 5,740,352 A * | 4/1998 | Philipp et al. | 714/40 |
| 5,748,229 A * | 5/1998 | Stoker | 348/180 |
| 5,818,540 A * | 10/1998 | Mies et al. | 348/559 |
| 5,937,077 A * | 8/1999 | Chan et al. | 382/100 |
| 7,002,637 B2 | 2/2006 | Szybiak et al. | |
| 7,006,698 B2 * | 2/2006 | Adiletta et al. | 382/236 |
| 7,424,160 B1 | 9/2008 | Basse | |
| 7,427,989 B2 * | 9/2008 | Dotson et al. | 345/554 |
| 7,441,154 B2 * | 10/2008 | Klotz et al. | 714/39 |
| 7,505,604 B2 * | 3/2009 | Zakrzewski et al. | 382/100 |
| 7,612,832 B2 * | 11/2009 | Zhang et al. | 348/700 |
| 7,729,510 B2 * | 6/2010 | Zakrzewski et al. | 382/100 |
| 7,876,355 B2 * | 1/2011 | Stevens | 348/180 |
| 2012/0019720 A1 * | 1/2012 | Nezu et al. | 348/559 |

* cited by examiner

*Primary Examiner* — Paulos M Natnael
(74) *Attorney, Agent, or Firm* — Thomas A. Ward

(57) ABSTRACT

A method is disclosed of analyzing a video stream using a video analyzer. The video stream includes image frame data corresponding to an integer N number of image frames, respectively. The video analyzer includes a controller and a frame processor. The method includes setting a problem threshold value corresponding to a parameter of the image frame data, receiving first image frame data corresponding to a first image frame, analyzing the parameter of a portion of the received first image frame data and generating an analyzed value and determining whether there is a problem based on the analyzed value and the problem threshold value. The portion of the analyzed portion of the received first image frame data is less than the total received first image frame data.

18 Claims, 5 Drawing Sheets

SYSTEM AND METHOD OF ANALYZING VIDEO STREAMS FOR DETECTING BLACK/SNOW OR FREEZE

BACKGROUND

The present invention generally relates to systems and methods for detecting problems that occur when encoding uncompressed video or transcoding compressed video.

In the video industry, typically video is recorded in an uncompressed format. If video is stored as a compressed format, it is usually first uncompressed before being compressed again to another codec (transcoding). The uncompressed format is typically compressed and encoded for storage, e.g., a DVD, or for transmission, e.g., from a cable headend.

Figure 1:
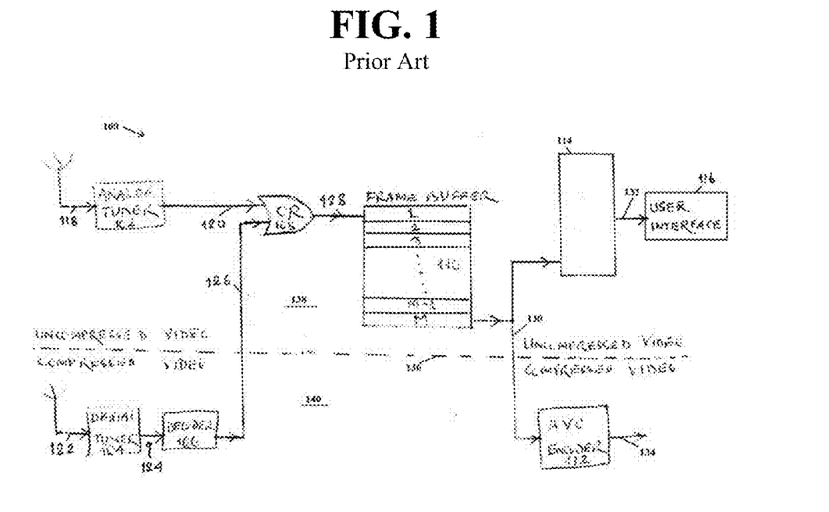
FIG. 1 illustrates a prior art video processing system.

FIG. 1 illustrates a prior art video processing system 100. As illustrated, video processing system 100 includes an analog tuner 102, a digital tuner 104, a decoder 106, an OR gate 108, a frame buffer 110, a video analyzer 114, a user interface 116 and an encoder 112. An area 138 above a dotted line 136 represents the portions of video processing system 100 dealing with uncompressed video. An area 140 below dotted line 136 represents the portions of video processing system 100 dealing with compressed video.

Analog tuner 102 is arranged to receive an analog signal 118 and output a tuned signal 120. Digital tuner 104 is arranged to receive a digital signal 122 and output a tuned signal 124. Decoder 106 receives tuned signal 124 and outputs a digital decoded signal 126. OR gate 108 is arranged to receive data corresponding to image frames in tuned signal 120 and decoded signal 126, and output a data signal 128.

Data corresponding to image frames in signal 128 are stored in frame buffer 110 which outputs a signal 130. Video analyzer 114 receives signal 130 and output a processed signal 132. User interface 116 is arranged to receive processed signal 132. Encoder 112 is arranged to receive signal 130 and output a signal 134.

In operation video processing system 100 receives video in analog or digital format, where video comprises a sequence of image frames. Image frames are comprised of matrices of pixels, each pixel being represented by data corresponding to luminance and color information, the data of all the pixels making up the data of one image frame, the data of all the image frames making up the data of the video stream.

Some prior art video processing systems may have only one of an analog tuner and a digital tuner. Because video processing system 100 includes analog tuner 102 and digital tuner 104, it may process video from either tuner. OR gate 108 enables a video stream to be processed by passing either tuned signal 120 or decoded signal 126 as data signal 128. Data corresponding to image frames in signal 128 are stored in frame buffer 110, which may then be subsequently output as signal 130 to encoder 112. Encoder 112 then encodes the data in signal 130 by known methods and outputs signal 134 for storage, e.g., on a digital video disk (DVD), or delivery to the customers, e.g., satellite television. The data in signal 130 additionally passes to video analyzer 114. Video analyzer 114 analyzes the data corresponding to image frames and may determine whether there is a problem with the video. Upon detection of a problem, video analyzer 114 provides an indication of a problem to a user by way of user interface 116.

A more detailed discussion of video analyzer 114 will now be provided. Video analyzer 114 detects system problems as evidences by a plurality of black images, i.e., a black portion of the video, or unwanted repeated images, i.e., a frozen portion of the video. After detecting a problem, the system may signal a user of a problem with the video. The detection is done by observing sequence of image frames and the luminance and chromatic information of a subset of the total number of pixels of the image frame.

Signal 134 includes a stream of video data corresponding to a plurality of image frames. However, if a portion of the video freezes or turns black, signal 134 will include a portion of the video data corresponding to the frozen image frames or the black image frames.

Storing or transmitting frozen or black image frames is not desired. Accordingly, video analyzer 114 monitors the stream of video data and provides a signal when signal 134 includes a portion of video data corresponding to frozen image frames or black image frames.

One prior art video analyzer detects black/freeze portions of a video by using horizontal motion detector to detect motion across the horizontal axis of the image frames within the video and by using a similar vertical motion detector to detect motion across the vertical axis of the image frames within the video. A problem with this prior art video analyzer is that it is hardware based and its computational method is complex and is not flexible.

Another prior art video analyzer detects the freeze through pixel by pixel comparison of entire image frames, and then averages out the observations over several image frames. A problem with this prior art video analyzer is that it is extremely computationally intensive.

The prior art systems discussed above do not address the presence of noise, i.e., snow, which is often found in video coming from analog domain. Furthermore, the hardware and computational complexity with prior art video analyzers are rigidly fixed and are not scalable.

What is needed is a system and method that is able to detect black/snow or freeze in a video stream with less hardware and less computational complexity, and is scalable and reduces the effect of noise in the system.

BRIEF SUMMARY

The present invention provides a system and method for detecting black/snow or freeze in a video stream with less hardware and less computational complexity, and is scalable and reduces the effect of noise in the system.

In accordance with an aspect of the present invention, a method of analyzing a video stream may be performed using a video analyzer. The video stream includes image frame data corresponding to an integer N number of image frames, respectively. The video analyzer includes a controller and a frame processor. The method includes setting a problem threshold value corresponding to a parameter of the image frame data, receiving first image frame data corresponding to a first image frame, analyzing the parameter of a portion of the received first image frame data and generating an analyzed value and determining whether there is a problem based on the analyzed value and the problem threshold value. The portion of the analyzed portion of the received first image frame data is less than the total received first image frame data.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

In accordance with an aspect of the present invention, a video analyzer is operable to distinguish black portions of a video by analyzing a parameter on a portion of an image frame.

In accordance with another aspect of the present invention, a video analyzer is operable to distinguish frozen portions of a video by comparing an analyzed parameter on a portion of an image frame with a moving-average of analyzed parameters on similar portions of subsequent image frames. In an example embodiment, the analyzed feature is intensity and chromatic information and the portion of the image frame includes pixels within one or more lines of each image frame. The effectiveness of a video analyzer in accordance with an aspect of the present invention is easily adjusted to adapt to available computational power. Non-limiting examples of adjusting a video analyzer in accordance with an aspect of the present invention include adjusting the size of the portion of the image frame being analyzed; adjusting a window size of the moving-average of analyzed parameters and adjusting thresholds for determining black or repeated image frames, as will be discussed in more detail below.

The present invention provides an improved technique for black/freeze video detection through a simple algorithmic approach. In particular, the algorithmic approach in accordance with an aspect of the present invention is scalable in terms of computation complexity tuned to the processing power available on the system. Further, the algorithmic approach in accordance with an aspect of the present invention uses a moving-average technique to draw improved conclusion over N consecutive image frames, rather than two or three consecutive image frames. Still further, the algorithmic approach in accordance with an aspect of the present invention enables improved detection of black/freeze under noisy condition through averaging over a plurality of N image frames. Additionally, the algorithmic approach in accordance with an aspect of the present invention incorporates a controllable reaction time and a controllable risk of error by changing the number of image frames in the moving-average as well as changing the number of analysis lines on each image frame. Finally, the algorithmic approach in accordance with an aspect of the present invention incorporates controllable detection ability as trade off against detection sensitivity under noisy conditions.

An example embodiment of a system and method in accordance with an aspect of the present invention will now be described with reference to FIGS. 2-9.

Figure 2:
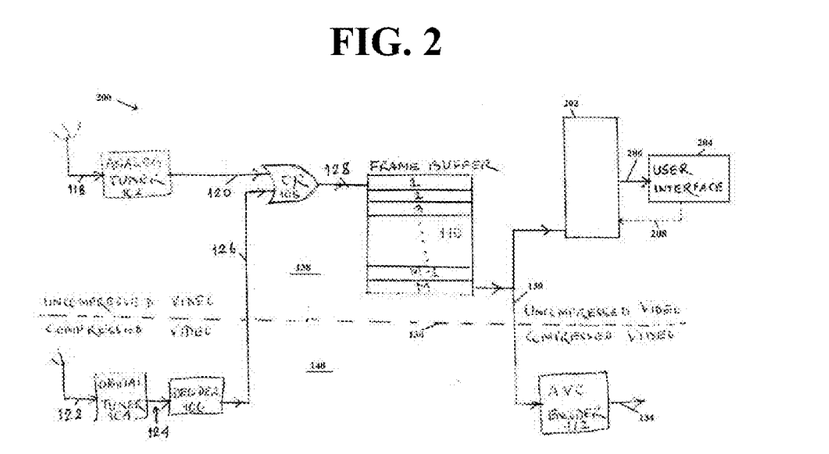
FIG. 2 illustrates an example video processing system in accordance with an aspect of the present invention.

FIG. 2 illustrates an example video processing system in accordance with an aspect of the present invention.

In the figure, video processing system 200 is similar to video processing system 100 discussed above with reference to FIG. 1. However, video analyzer 114 and a user interface 116 of video processing system 100 are replaced with video analyzer 202 and user interface 204 in video processing system 200. Video analyzer 202 is arranged to receive signal 130 and output a signal 206 and user interface 204 is arranged to receive signal 206.

Video processing system 200 detects system or equipment failure by processing uncompressed video obtained at output 120 of analog tuner 102 or output 126 of decoder 106. Uncompressed video 128 is stored image frame by image frame in frame buffer 110. Output 130 of frame buffer 110 is input to encoder 112; it is this signal 130 on which freeze/black condition is detected.

Video analyzer 202 performs signal processing on a plurality of image frames from frame buffer 110. Unlike the prior art video analyzers discussed above with reference to FIG. 1, video analyzer 202 processor detects a parameter of a portion of image frame data, as opposed to the entire image frame data.

In accordance with one aspect of the present invention, this parameter of the portion of image frame data may be compared with a predetermined threshold to determine whether the image frame is black or snowy, thus indicating that the video stream may have been interrupted.

A black portion of a video stream may be described as an image frame having no image data, or image data below a predetermined interrupted threshold. For analysis purposes, a black portion of a video stream may be detected by determining whether a value of a detected parameter of an analyzed portion of an image frame is less than a predetermined threshold, $S_{black}$. Further, there may be instances wherein a portion of the video stream is intentionally black. To account for such instances, embodiments of the present invention may establish a threshold integer P of consecutive image frames within the video stream that are determined to be problematic (in this case, black) before providing an indication that a portion of the video stream is likely to be problematic.

For example, suppose a parameter is intensity and chromatic information and suppose an analyzed portion is a horizontal line of pixels within an image frame. Further, in this example, suppose the video stream is interrupted such that the last four image frames are black within a video stream of six image frames. Finally, in this example, suppose that the threshold integer P is set to three, such that when three consecutive image frames within the video stream are determined to be black an indication will be provided that a portion of the video stream is likely to be unintentionally black.

In the above discussed example, the intensity and chromatic information of a single corresponding horizontal line of pixels within each image frame is analyzed. When the first two image frames are analyzed, it will be determined that the intensity and chromatic information of a horizontal line of pixels within each image frame exceeds the predetermined threshold, $S_{black}$. When the next three image frames that are black are analyzed, it will be determined that the intensity and chromatic information of a horizontal line of pixels within each image frame is below the predetermined threshold, $S_{black}$. Therefore, each of these next three image frames will be determined to be black. However, at this point, the three consecutive frames that are determined to be black do not exceed the required three consecutive image frames as set by the threshold integer P. Yet when the next image frame that is black is analyzed, it will be determined that the intensity and chromatic information of a horizontal line of pixels within that image frame is additionally below the predetermined threshold, $S_{black}$. Thus, this next image frame will additionally be determined to be black. At this point, the four consecutive frames that are determined to be black are more than the required three consecutive image frames as set by the threshold integer P. Accordingly, in this case, the portion of the video stream will be determined to be unintentionally black.

A snowy portion of a video stream may be described as an image frame having random image data, thus providing an image of "snow" or static. For analysis purposes, a snowy portion of a video stream may be detected by: 1) determining whether a value of a detected parameter of an analyzed portion of an image frame is less than a predetermined threshold, $S_{snow}$, wherein $S_{snow} > S_{black}$, and 2) determining whether the value of the detected parameter of the analyzed portion of the image frame is within a threshold value $\delta_{snow}$ of similar portions of image frame data of a predetermined integer P subsequent image frames. Further, there may be instances wherein a portion of the video stream is intentionally snowy. To account for such instances, embodiments of the present invention may establish the threshold integer P of consecutive image frames within the video stream that are determined to be problematic (in this case, snowy) before providing an indication that a portion of the video stream is likely to be problematic.

For example, suppose a parameter is intensity and chromatic information and suppose an analyzed portion is a horizontal line of pixels within an image frame. Further, in this example, suppose the video stream is so replete with interference that the last four image frames are snowy within a video stream of six image frames. Finally, in this example, suppose that the threshold integer P is set to three, such that when three consecutive image frames within the video stream are determined to be snowy an indication will be provided that a portion of the video stream is likely to be either interrupted or too replete with interference to process the data.

In the above discussed example, the intensity and chromatic information of a single corresponding horizontal line of pixels within each image frame is analyzed. When the first two image frames are analyzed, it will be determined that the intensity and chromatic information of a horizontal line of pixels within each image frame exceeds the predetermined threshold, $S_{snow}$. When the next three image frames that are snowy are analyzed, it will be determined that the intensity and chromatic information of a horizontal line of pixels within each image frame is below the predetermined threshold, $S_{snow}$. Therefore, each of these next three image frames will be determined to be snowy. However, at this point, the three consecutive frames that are determined to be snowy do not exceed the required three consecutive image frames as set by the threshold integer P. Yet when the next image frame that is snowy is analyzed, it will be determined that the intensity and chromatic information of a horizontal line of pixels within that image frame is additionally below the predetermined threshold, $S_{snow}$. Thus, this next image frame will additionally be determined to be snow. At this point, the four consecutive frames that are determined to be snowy are more than the required three consecutive image frames as set by the threshold integer P. Accordingly, in this case, the portion of the video stream will be determined to be either interrupted or too replete with interference to process the data.

In accordance with another aspect of the present invention, the parameter of the portion of image frame data may be compared to a moving-average of similar portions of image frame data of a predetermined integer M subsequent image frames. This averaging over multiple image frames may be compared with a predetermined threshold to determine whether an image frame is repeating, thus indicating that the video stream may have been frozen.

A frozen portion of a video stream may be described as an unwanted repetition of an image frame. Let a change in the value of a parameter for corresponding portions of a predetermined number of consecutive image frames, i.e., a window size M of a moving-average, respectively, be $\delta_{av}$. For analysis purposes, a frozen portion of a video stream may be detected by determining whether $\delta_{av}$ is less than a predetermined threshold, $\delta_{max}$.

For example, suppose a parameter is intensity and chromatic information and suppose an analyzed portion is a horizontal line of pixels within an image frame. Further, suppose for example, that that the window size of the moving-average M is three (3). Finally, in this example, suppose the first three image frames are different, but the last three image frames are duplicates of the third image frame. As will be further explained below, three successive image frames are analyzed to establish an average. From then on, each successive image frame is analyzed against to determine a new average of itself and the preceding two image frames.

In the above discussed example, the intensity and chromatic information of a single corresponding horizontal line of pixels is analyzed for the first image frame. The average value of the horizontal line of pixels for the first image frame determined (in this case, since there is only one value, the average is the value).

When the intensity and chromatic information of the corresponding horizontal line of pixels is analyzed for the second image frame. The average value of the horizontal line of pixels for the first image frame and the second image frame is determined. Then the absolute value of the average change, $|\delta_{av}|$, between the average value of the horizontal line of pixels for the first image frame and the second image frame and the average value of the horizontal line of pixels for the first image frame is determined. Presume in this example that the first image frame is sufficiently different from the second image frame that the absolute value of the average change, $|\delta_{av}|$, is greater than predetermined threshold, $\delta_{max}$.

Then, the intensity and chromatic information of a single corresponding horizontal line of pixels is analyzed for the third image frame. The average value of the horizontal line of pixels for the first, second and third image frames is determined. Then the average change, $\delta_{av}$, between the average value of the horizontal line of pixels for the first, second and third image frames and the average value of the horizontal line of pixels for the first image frame and the second image frame is determined. Presume in this example that the first, second and third image frames are sufficiently different that the absolute value of the average change, $|\delta_{av}|$, is greater than predetermined threshold, $\delta_{max}$.

Then, the intensity and chromatic information of a single corresponding horizontal line of pixels is analyzed for the fourth image frame. Now, since window size of the moving-average M is three (3), the value of the horizontal line of pixels for the first image frame is not used. Accordingly, the average value of the horizontal line of pixels for the second, third and fourth image frames is determined. Then the absolute value of the average change, $|\delta_{av}|$, between the average value of the horizontal line of pixels for the first through third image frames and the average value of the horizontal line of pixels for the second through fourth image frames is determined. Presume in this example that the second image frame is sufficiently different from the third image frame that the absolute value of the average change, $|\delta_{av}|$, is greater than predetermined threshold, $\delta_{max}$.

Then, the intensity and chromatic information of a single corresponding horizontal line of pixels is analyzed for the fifth image frame. Now, since window size of the moving-average M is three (3), the value of the horizontal line of pixels for the first image frame and the second image frame are not used. Accordingly, the average value of the horizontal line of pixels for the third, fourth and fifth image frames is determined. Then the absolute value of the average change, $|\delta_{av}|$, between the average value of the horizontal line of pixels for the second through fourth image frames and the average value of the horizontal line of pixels for the third through fifth image frames is determined. Now, presume in this example that the second image frame is sufficiently different from the third image frame that the absolute value of the average change, $|\delta_{av}|$, is greater than predetermined threshold, $\delta_{max}$.

Then, the intensity and chromatic information of a single corresponding horizontal line of pixels is analyzed for the sixth image frame. Now, since window size of the moving-average M is three (3), the value of the horizontal line of pixels for the first through third image frames are not used. Accordingly, the average value of the horizontal line of pixels for the fourth, fifth and sixth image frames is determined. Then the absolute value of the average change, $|\delta_{av}|$, between the average value of the horizontal line of pixels for the third through fifth image frames and the average value of the horizontal line of pixels for the fourth through sixth image frames is determined. Now, the absolute value of the average change, $|\delta_{av}|$, is be less than the predetermined threshold, $\delta_{max}$. Accordingly, in this case, the portion of the video will be determined to be frozen.

Examples of video streams processed by video analyzer 202 will now be discussed with reference to FIGS. 3-6.

For the sake of discussion of an example method of operating video analyzer 202 to analyze example video frames of FIGS. 3-6, presume that the parameter to be analyzed is intensity and chromatic information having a value Q and that the portion of an image frame to be analyzed includes two horizontal lines of pixels. Further, presume that threshold integer P, of which P consecutive frames must be determined to be black before an indication is provided that a portion of the video stream is likely unintentionally black, is set to three (3). Finally, presume that the window size M of the moving-average is additionally set to three (3).

Figure 3:
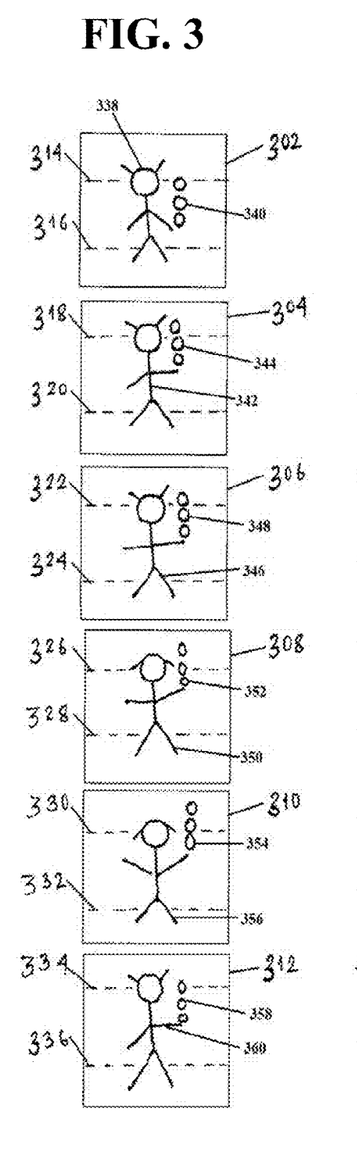
FIG. 3 illustrates an example received video stream including a plurality of image frames.

FIG. 3 illustrates an example received video stream including a plurality of image frames.

As illustrated in the figure, video stream 300 includes image frames 302, 304, 306, 308, 310 and 312. Image frame 302 includes an image of a person 338 juggling balls 340 at a time $t_0$. Image frame 304 includes an image of a person 342 and an image of balls being juggled 344 at a time $t_1$. Image frame 306 includes an image of a person 346 and an image of balls being juggled 348 at a time $t_2$. Image frame 308 includes an image of a person 350 and an image of balls being juggled 352 at a time $t_3$. Image frame 310 includes an image of a person 354 and an image of balls being juggled 356 at a time $t_4$. Image frame 312 includes an image of a person 358 and an image of balls being juggled 360 at a time $t_5$.

Each of image frames 302, 304, 306, 308, 310 and 312 correspond to an individual image at a respective individual time. However, when a person views image frames 302, 304, 306, 308, 310 and 312 individually in series on a display device (not shown), the person perceives a video of a person juggling balls.

In accordance with an aspect of the present invention, video analyzer 202 is operable to determine whether there is a problem with uncompressed video. Three example problems are when a portion of the video stream is frozen, when a portion of the video stream is black and when a portion of the video stream is snowy.

Returning now to FIG. 3, as discussed above, video analyzer 202 processes a portion of image data for each image frame.

In this example, and with reference to FIG. 3, video analyzer 202 processes: horizontal lines 314 and 316 of image frame 302; horizontal lines 318 and 320 of image frame 304; horizontal lines 322 and 324 of image frame 306; horizontal lines 326 and 328 of image frame 308; horizontal lines 330 and 332 of image frame 310; and horizontal lines 334 and 336 of image frame 312. Each horizontal line corresponds to a plurality of pixels, wherein each pixel has a corresponding intensity and chromatic information having a value Q.

When analyzing a horizontal line, video analyzer 202 sums the intensity value of the pixels of that analyzed horizontal line according to the following equation:

$$S_{m,k} = \Sigma_t^W = 1 Q_{m,k}(t) \tag{1}$$

where $Q_{m,k}(i)$ is a function of intensity and chromatic information value of $i^{th}$ pixel in line m of image frame k, and $S_{m,k}$ is the intensity and chromatic value of line m of image frame k. So, for image frame 302, line 314, the intensity and chromatic value $S_{314,302}$ is:

$$S_{314,302} = \Sigma_t^W = 1 Q_{314,302}(t) \tag{2}$$

Further, for image frame 302, line 316, the intensity and chromatic value $S_{316,302}$ is:

$$S_{316,302} = \Sigma_t^W = 1 Q_{316,302}(t) \tag{3}$$

For image frame 304, line 318, the intensity and chromatic value $S_{318,304}$ is:

$$S_{318,304} = \Sigma_t^W = 1 Q_{318,304}(t) \tag{4}$$

For image frame 304, line 320, the intensity and chromatic value $S_{320,304}$ is:

$$S_{320,304} = \Sigma_t^W = 1 Q_{320,304}(t) \tag{5}$$

The intensity and chromatic values for lines 322, 324, 326, 328, 330, 332, 334 and 336 can be determined in the same fashion.

In the case of FIG. 3, changes in the images over image frames 302, 304, 306, 308, 310 and 312 will make the absolute value of the average change, $|\delta_{av}|$, exceed the threshold $\delta_{max}$. Accordingly, it will be determined that no portion of the video is frozen.

Clearly, as illustrated, video stream 300 is not frozen and does not turn black. However, as will now be described with reference to FIG. 4, if a video stream does freeze, video analyzer 202, will make such a determination.

Figure 4:
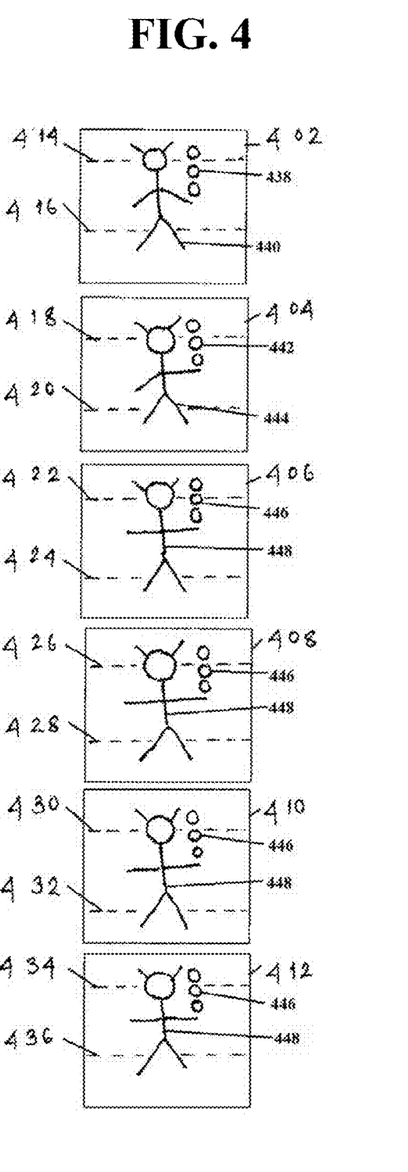
FIG. 4 illustrates another example received video stream including a plurality of image frames, wherein a portion of the video stream is frozen.

FIG. 4 illustrates another example received video stream including a plurality of image frames, wherein a portion of the video stream is frozen.

As illustrated in the figure, video stream 400 includes image frames 402, 404, 406, 408, 410 and 412. Image frame 402 includes an image of a person 440 juggling balls 438 at a time $t_0$. Image frame 404 includes an image of a person 444 and an image of balls being juggled 442 at a time $t_1$. Image frame 406 includes an image of a person 448 and an image of balls being juggled 446 at a time $t_2$. In this example, each of image frames 408, 410 and 412 includes an image of a person 448 and an image of balls being juggled 446 at times $t_3$, $t_4$ and $t_5$, respectively.

Each of image frames 402, 404, 406, 408, 410 and 412 correspond to an individual image at a respective individual time. However, when a person views image frames 402, 404, 406, 408, 410 and 412 individually in series on a display device (not shown), the person perceives a video of a person juggling balls up to a time $t_3$, wherein the image freezes until time $t_5$.

In this example video analyzer 202 processes: horizontal lines 414 and 416 of image frame 402; horizontal lines 418 and 420 of image frame 404; horizontal lines 422 and 424 of image frame 406; horizontal lines 426 and 428 of image frame 408; horizontal lines 430 and 432 of image frame 410; and horizontal lines 434 and 436 of image frame 412. Each horizontal line corresponds to a plurality of pixels, wherein each pixel has a corresponding intensity and chromatic information having a value Q.

Using equation (1), discussed above, video analyzer 202 determines the intensity and chromatic values for lines 414, 416, 418, 420, 422, 424, 426, 428, 430, 432, 434 and 436.

First, image frame 402 is analyzed, wherein the intensity and chromatic information having a value Q is determined for horizontal lines 414 and 416. At this point, image frame 404 is analyzed, wherein the intensity and chromatic information having a value Q is determined for horizontal lines 418 and 420. The intensity and chromatic information having a value Q of horizontal line 414 is averaged with the intensity and chromatic information having a value Q of horizontal line 418, whereas the intensity and chromatic information having a value Q of horizontal line 416 is averaged with the intensity and chromatic information having a value Q of horizontal line 420. Both averages are used to determine $\delta_{av}$ by any known mathematical function, a non-limiting example of which includes adding the averages. In this case, presume that the absolute value of the average change, $|\delta_{av}|$, for image frame 402 and image frame 404 is greater than threshold $\delta_{max}$. As such, at this point, video analyzer 202 will determine that this portion of video stream 400 is not frozen.

Next, image frame 406 is analyzed, wherein intensity and chromatic information having a value Q is determined for horizontal lines 422 and 424. The intensity and chromatic information having a value Q of horizontal lines 414, 418 and 422 are averaged, whereas the intensity and chromatic information having a value Q of horizontal lines 416, 420 and 424 are averaged. Again, both averages are used to determine $\delta_{av}$ by any known mathematical function, a non-limiting example of which includes adding the averages. In this case, presume that the absolute value of the average change, $|\delta_{av}|$, for image frames 402, 404 and 406 is greater than threshold $\delta_{max}$. As such, at this point, video analyzer 202 will determine that this portion of video stream 400 is not frozen.

Next, image frame 408 is analyzed, wherein intensity and chromatic information having a value Q is determined for horizontal lines 426 and 428. Now, as discussed above, the window size of the moving-average M is three (3). Therefore, image frame 402 is not considered in the average. As such, at this point, the intensity and chromatic information having a value Q of horizontal lines 418, 422 and 426 are averaged, whereas the intensity and chromatic information having a value Q of horizontal lines 420, 424 and 428 are averaged. Again, both averages are used to determine $\delta_{av}$ by any known mathematical function, a non-limiting example of which includes adding the averages. In this case, presume that the absolute value of the average change, $|\delta_{av}|$, for image frames 404, 406 and 408 is greater than threshold $\delta_{max}$. As such, at this point, video analyzer 202 will determine that this portion of video stream 400 is not frozen.

Next, image frame 410 is analyzed, wherein intensity and chromatic information having a value Q is determined for horizontal lines 430 and 432. With the window size of the moving-average M set at three (3), neither image frame 402 nor image frame 404 is considered in the average. As such, at this point, the intensity and chromatic information having a value Q of horizontal lines 422, 426 and 430 are averaged, whereas the intensity and chromatic information having a value Q of horizontal lines 424, 428 and 432 are averaged. Again, both averages are used to determine $\delta_{av}$ by any known mathematical function, a non-limiting example of which includes adding the averages. In this case, the intensity and chromatic information having a value Q of horizontal lines 426 and 430 are equal and the intensity and chromatic information having a value Q of horizontal lines 428 and 432 are equal because the images corresponding to image frames 408 and 410 are the same. However, presume in this case that the intensity and chromatic information having a value Q of horizontal line 422 is sufficiently different from the intensity and chromatic information having a value Q of horizontal lines 426 (and 430) and that the intensity and chromatic information having a value Q of horizontal line 424 is sufficiently different from the intensity and chromatic information having a value Q of horizontal line 428 (and 432) such that the absolute value of the average change, $|\delta_{av}|$, for image frames 406, 408 and 410 is greater than threshold $\delta_{max}$. As such, at this point, video analyzer 202 will determine that this portion of video stream 400 is not frozen.

Next, image frame 412 is analyzed, wherein intensity and chromatic information having a value Q is determined for horizontal lines 434 and 436. With the window size of the moving-average M set at three (3), image frames 402, 404 and 406 are not is considered in the average. As such, at this point, the intensity and chromatic information having a value Q of horizontal lines 426, 430 and 434 are averaged, whereas the intensity and chromatic information having a value Q of horizontal lines 428, 432 and 436 are averaged. Again, both averages are used to determine $\delta_{av}$ by any known mathematical function, a non-limiting example of which includes adding the averages. In this case, the intensity and chromatic information having a value Q of horizontal lines 426, 430 and 434 are equal and the intensity and chromatic information having a value Q of horizontal lines 428, 432 and 436 are equal because the images corresponding to image frames 408, 410 and 412 are the same. Therefore, the absolute value of the average change, $|\delta_{av}|$, for image frames 408, 410 and 412 is zero, which is less than threshold $\delta_{max}$. As such, at this point, video analyzer 202 will determine that this portion of video stream 400 is frozen.

If threshold $\delta_{max}$ is decreased, then video analyzer 202 would only determine that a portion of a video stream is frozen when the absolute value of the average change, $|\delta_{av}|$, decreases, e.g., the intensity and chromatic information having a value Q of horizontal lines of the image frames are very close. However, there may be instances when the image frames would be identical, if not for errors in the data corresponding to each image frame. To account for such instances, $\delta_{max}$, may be increased. Unfortunately, if $\delta_{max}$ is increased, video analyzer 202 may incorrectly determine that a portion of a video stream is frozen, when in actuality, the video stream has changed minimally.

If the window size of the moving-average M is decreased, then video analyzer 202 may more quickly determine when a portion of a video stream is frozen. However, if the window size of the moving-average M is decreased, then the likelihood that video analyzer 202 may incorrectly determine that portion of a video stream is frozen will increase, for example in cases when the freeze was intentional or there is a slight change in the image frames. If the window size of the moving-average M is increased, then video analyzer 202 may take longer to determine when a portion of a video stream is frozen. However, if the window size of the moving-average M is increased, then the likelihood that video analyzer 202 may incorrectly determine that portion of a video stream is frozen will decrease, for example in cases when the freeze was intentional or there is a slight change in the image frames.

Clearly, as illustrated, video stream 400 freezes. As will now be described with reference to FIG. 5, if a video stream is interrupted and turns black, video analyzer 202, will make such a determination.

Figure 5:
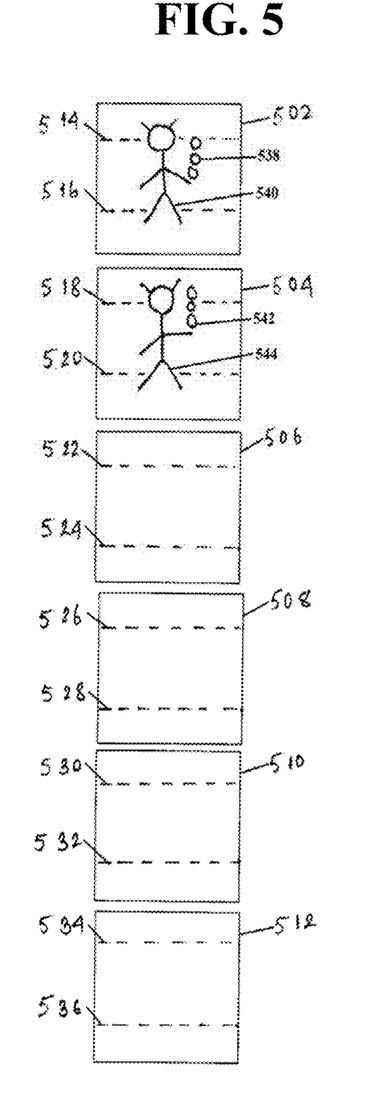
FIG. 5 illustrates another example received video stream including a plurality of image frames, wherein a portion of the video stream is interrupted.

FIG. 5 illustrates another example received video stream including a plurality of image frames, wherein a portion of the video stream is interrupted.

As illustrated in the figure, video stream 500 includes image frames 502, 504, 506, 508, 510 and 512. Image frame 502 includes an image of a person 540 juggling balls 538 at a time $t_0$. Image frame 504 includes an image of a person 544 and an image of balls being juggled 542 at a time $t_1$. In this example, each of image frames 506, 508, 510 and 512 includes a black image at times $t_2$, $t_3$, $t_4$ and $t_5$, respectively.

Each of image frames 502, 504, 506, 508, 510 and 512 correspond to an individual image at a respective individual time. However, when a person views image frames 502, 504, 506, 508, 510 and 512 individually in series on a display device (not shown), the person perceives a video of a person juggling balls up to a time $t_2$, wherein the image turns black until time $t_5$.

In this example video analyzer 202 processes: horizontal lines 514 and 516 of image frame 502; horizontal lines 518 and 520 of image frame 504; horizontal lines 522 and 524 of image frame 506; horizontal lines 526 and 528 of image frame 508; horizontal lines 530 and 532 of image frame 510; and horizontal lines 534 and 536 of image frame 512. Each horizontal line corresponds to a plurality of pixels, wherein each pixel has a corresponding intensity and chromatic information having a value Q.

Using equation (1), discussed above, video analyzer 202 determines the intensity and chromatic values for lines 514, 516, 518, 520, 522, 524, 526, 528, 530, 532, 534 and 536.

First, image frame 502 is analyzed, wherein intensity and chromatic information having a value Q is determined for horizontal lines 514 and 516. In this case, as there is an image in image frame 502, presume that the intensity and chromatic information having a value Q is determined to be greater than the predetermined parameter threshold $S_{black}$. As such, at this point, video analyzer 202 will determine that this portion of video stream 500 is not black.

Next, image frame 504 is analyzed, wherein intensity and chromatic information having a value Q is determined for horizontal lines 518 and 520. In this case, as there is an image in image frame 504, presume that the intensity and chromatic information having a value Q is determined to be greater than the predetermined parameter threshold $S_{black}$. As such, at this point, video analyzer 202 will determine that this portion of video stream 500 is not black.

Next, image frame 506 is analyzed, wherein intensity and chromatic information having a value Q is determined for horizontal lines 522 and 524. In this case, as there is no image in image frame 506, presume that the intensity and chromatic information having a value Q is determined to be zero, which is less than the predetermined parameter threshold $S_{black}$. As such, at this point, video analyzer 202 will determine that this portion of video stream 500 is black.

At this point, although image frame 506 is determined to be black, the predetermined threshold P has not been exceeded. As such, an indication is not provided that this portion of video stream 500 is likely unintentionally black.

Next, image frame 508 is analyzed, wherein intensity and chromatic information having a value Q is determined for horizontal lines 526 and 528. In this case, as there is no image in image frame 508, presume that the intensity and chromatic information having a value Q is determined to be zero, which is less than the predetermined parameter threshold $S_{black}$. As such, at this point, video analyzer 202 will determine that this portion of video stream 500 is black.

At this point, although the two consecutive image frames 506 and 508 are determined to be black, the predetermined threshold P has not been exceeded. As such, an indication is not provided that this portion of video stream 500 is likely unintentionally black.

Next, image frame 510 is analyzed, wherein intensity and chromatic information having a value Q is determined for horizontal lines 530 and 532. In this case, as there is no image in image frame 510, presume that the intensity and chromatic information having a value Q is determined to be zero, which is less than the predetermined parameter threshold $S_{black}$. As such, at this point, video analyzer 202 will determine that this portion of video stream 500 is black.

At this point, although the three consecutive image frames 506, 508 and 510 are determined to be black, the predetermined threshold P has not been exceeded. As such, an indication is not provided that this portion of video stream 500 is likely unintentionally black.

Next, image frame 512 is analyzed, wherein intensity and chromatic information having a value Q is determined for horizontal lines 534 and 536. In this case, as there is no image in image frame 512, presume that the intensity and chromatic information having a value Q is determined to be zero, which is less than the predetermined parameter threshold $S_{black}$. As such, at this point, video analyzer 202 will determine that this portion of video stream 500 is black.

At this point, the four consecutive image frames 506, 508, 510 and 512 are determined to be black and the predetermined threshold P has been exceeded. As such, an indication is provided that this portion of video stream 500 is likely unintentionally black.

Clearly, as illustrated, video stream 500 turns black. As will now be described with reference to FIG. 6, if a video stream is interrupted and provides snow for an image, video analyzer 202, will make such a determination.

Figure 6:
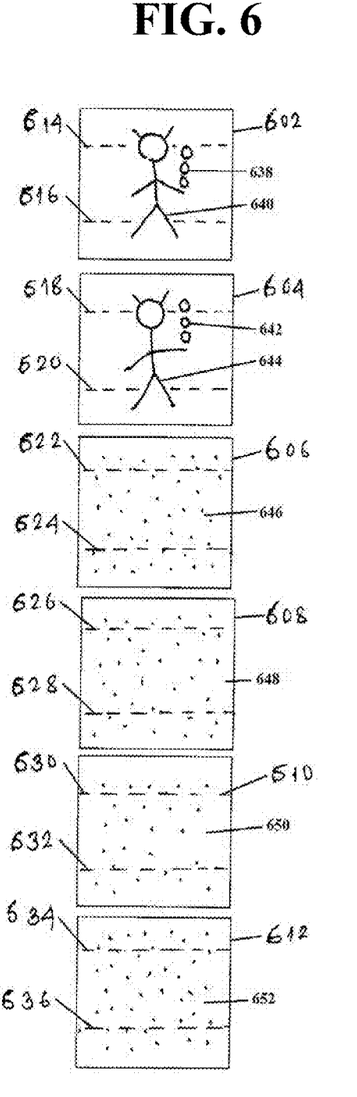
FIG. 6 illustrates another example received video stream including a plurality of image frames, wherein a portion of the video stream is interrupted.

FIG. 6 illustrates another example received video stream including a plurality of image frames, wherein a portion of the video stream is either interrupted or too replete with interference to process the data.

As illustrated in the figure, video stream 600 includes image frames 602, 604, 606, 608, 610 and 612. Image frame 602 includes an image of a person 640 juggling balls 638 at a time $t_0$. Image frame 604 includes an image of a person 644 and an image of balls being juggled 642 at a time $t_1$. In this example, each of image frames 606, 608, 610 and 612 includes a snowy image at times $t_2$, $t_3$, $t_4$ and $t_5$, respectively.

Each of image frames 602, 604, 606, 608, 610 and 612 correspond to an individual image at a respective individual time. However, when a person views image frames 602, 604, 606, 608, 610 and 612 individually in series on a display device (not shown), the person perceives a video of a person juggling balls up to a time $t_2$, wherein the image turns snowy until time $t_5$.

First, image frame 602 is analyzed, wherein intensity and chromatic information having a value Q is determined for horizontal lines 614 and 616. In this case, as there is an image in image frame 602, presume that the intensity and chromatic information having a value Q is determined to be greater than the predetermined parameter threshold $S_{snow}$. As such, at this point, video analyzer 202 will determine that this portion of video stream 600 is not snowy.

Next, image frame 604 is analyzed, wherein intensity and chromatic information having a value Q is determined for horizontal lines 618 and 620. In this case, as there is an image in image frame 604, presume that the intensity and chromatic information having a value Q is determined to be greater than the predetermined parameter threshold $S_{snow}$. As such, at this point, video analyzer 202 will determine that this portion of video stream 600 is not snowy.

Next, image frame 606 is analyzed, wherein intensity and chromatic information having a value Q is determined for horizontal lines 622 and 624. In this case, as there is a snowy image in image frame 606, presume that the intensity and chromatic information having a value Q is determined to be greater than zero (as there is random data), but less than the predetermined parameter threshold $S_{snow}$. Further, presume that as a result of the randomness of the image data of image frame 606 that it is determined that the difference between the intensity and chromatic information having a value Q of frame 606 and the intensity and chromatic information having a value Q of frame 604 is greater than the threshold parameter $\delta_{snow}$. As such, at this point, video analyzer 202 will determine that this portion of video stream 600 is snowy.

At this point, although image frame 606 is determined to be snowy, the predetermined threshold P has not been exceeded. As such, an indication is not provided that this portion of video stream 600 is likely unintentionally snowy.

Next, image frame 608 is analyzed, wherein intensity and chromatic information having a value Q is determined for horizontal lines 626 and 628. In this case, as there is a snowy image in image frame 608, presume that the intensity and chromatic information having a value Q is determined to be greater than zero (as there is random data), but less than the parameter threshold $S_{snow}$. Further, presume that as a result of the randomness of the image data of image frame 606 and the randomness of the image data of image frame 608, it is determined that the difference between the intensity and chromatic information having a value Q of frame 608 and the intensity and chromatic information having a value Q of frame 606 is greater than the threshold parameter $\delta_{snow}$. As such, at this point, video analyzer 202 will determine that this portion of video stream 600 is snowy.

At this point, although the two consecutive image frames 606 and 608 are determined to be snowy, the predetermined threshold P has not been exceeded. As such, an indication is not provided that this portion of video stream 600 is likely unintentionally snowy.

Next, image frame 610 is analyzed, wherein intensity and chromatic information having a value Q is determined for horizontal lines 630 and 632. In this case, as there is a snowy image in image frame 610, presume that the intensity and chromatic information having a value Q is determined to be greater than zero (as there is random data), but less than the parameter threshold $S_{snow}$. Further, presume that as a result of the randomness of the image data of image frame 608 and the randomness of the image data of image frame 610, it is determined that the difference between the intensity and chromatic information having a value Q of frame 610 and the intensity and chromatic information having a value Q of frame 608 is greater than the threshold parameter $\delta_{snow}$. As such, at this point, video analyzer 202 will determine that this portion of video stream 600 is snowy.

At this point, although the three consecutive image frames 606, 608 and 610 are determined to be snowy, the predetermined threshold P has not been exceeded. As such, an indication is not provided that this portion of video stream 600 is likely unintentionally snowy.

Next, image frame 612 is analyzed, wherein intensity and chromatic information having a value Q is determined for horizontal lines 634 and 636. In this case, as there is a snowy image in image frame 612, presume that the intensity and chromatic information having a value Q is determined to be greater than zero (as there is random data), but less than the predetermined parameter threshold $S_{snow}$. Further, presume that as a result of the randomness of the image data of image frame 610 and the randomness of the image data of image frame 612, it is determined that the difference between the intensity and chromatic information having a value Q of frame 612 and the intensity and chromatic information having a value Q of frame 610 is greater than the threshold parameter $\delta_{snow}$. As such, at this point, video analyzer 202 will determine that this portion of video stream 600 is snowy.

At this point, the four consecutive image frames 606, 608, 610 and 612 are determined to be snowy and the predetermined threshold P has been exceeded. As such, an indication is provided that this portion of video stream 600 is likely unintentionally snowy.

An example method of detecting error of freeze/black out in encoded video stream in accordance with the present invention will now be described with reference to FIGS. 7-9.

In accordance with one aspect of the present invention, an error may be detected during the encoding of a video stream by analyzing a moving-average of a parameter of a portion of data of a number of consecutive image frames within the video stream. This aspect will be described in more detail below with reference to FIG. 7.

Figure 7:
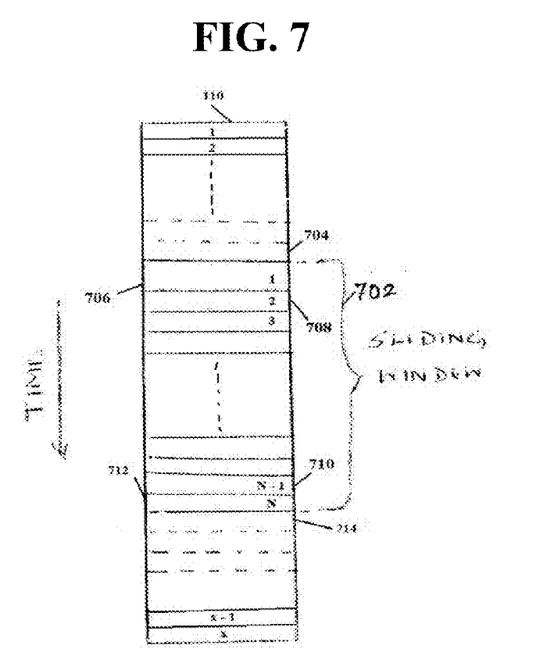
FIG. 7 illustrates an example employment of a sliding window within a frame buffer in accordance with an aspect with the present invention.

FIG. 7 illustrates an example employment of a sliding window within a frame buffer in accordance with an aspect with the present invention.

As illustrated, the figure shows a schematic diagram of a sliding window of M image frames in frame buffer 110. Frame buffer 110 includes a plurality of addressable storage registers, each of which is operable to store image data corresponding to an individual image frame. In this example, frame buffer 110 includes x total registers. In this example, the maximum number of image frames that may be analyzed to form an average at a specific time is the predetermined size of a sliding window 702. Sliding window 702 is not an actual physical device, but instead represents the maximum number of data points to be analyzed. In this example, sliding window 702 is operable to analyze data within M consecutive registers within frame buffer 110.

To help explain the analysis by way of sliding window 702, consider the analysis aver three consecutive time periods, as follows.

Presume at a first time $t_0$, video analyzer 202 analyses data within M consecutive registers of frame buffer 110, starting with the data in register 704 and ending with the data in register 710.

At a next time $t_1$, video analyzer 202 analyses data within M consecutive registers of frame buffer 110, starting with the data in register 706 and ending with the data in register 712. Clearly, this new data set does not include the data within register 704, but now includes the data within register 710.

At a next time $t_2$, video analyzer 202 analyses data within M consecutive registers of frame buffer 110, starting with the data in register 708 and ending with the data in register 714. Clearly, this new data set does not include the data within register 704 or 706, but now includes the data within register 714.

At every time interval, the sliding window moves to exclude the oldest image frame data and to include a new image frame data. For purposes of simplifying explanation, presume that image data corresponding to image frames are individually stored data within the data registers in frame buffer 110 from top to bottom, i.e., an image frame is stored in register 704, the next image frame is stored in register 706, the next image frame is stored in register 708, etc.

An example embodiment of freeze/black out error detection system and method in accordance with an aspect of the present invention will now be described with reference to FIGS. 8-9.

Figure 8:
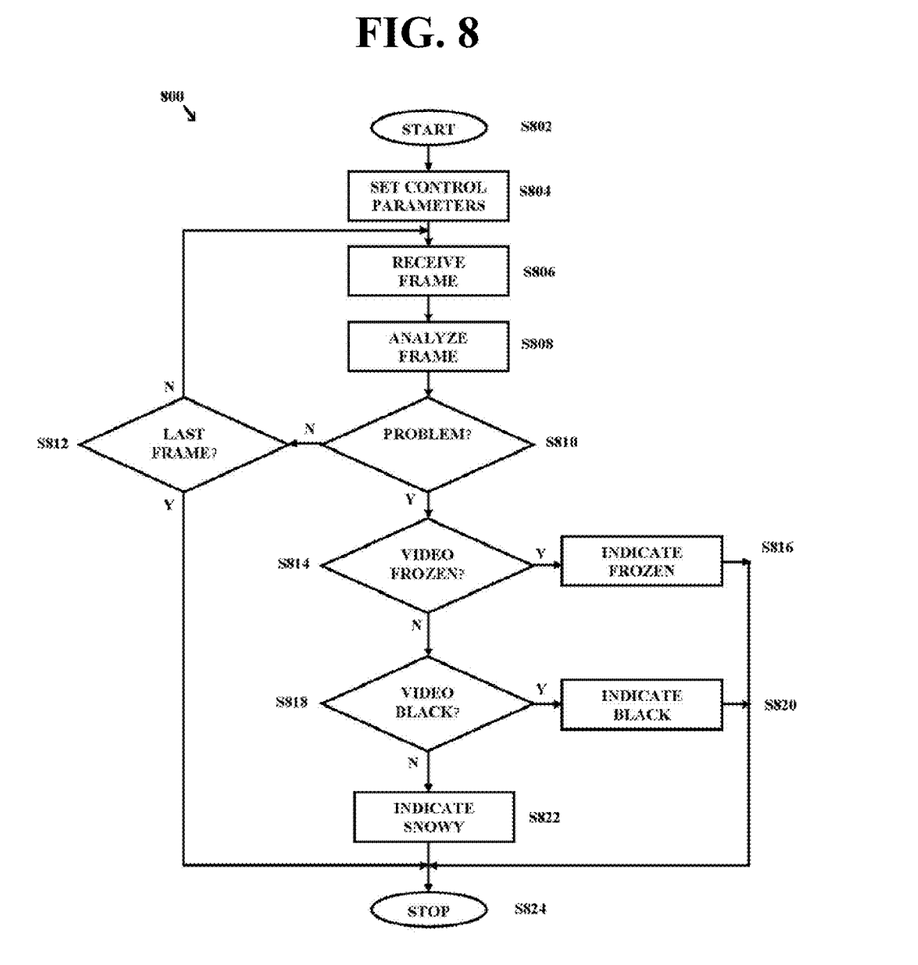
FIG. 8 illustrates an example method of processing received video in accordance with an aspect of the present invention.

FIG. 8 illustrates an example method of processing received video in accordance with an aspect of the present invention. FIG. 9 illustrates an example video analyzer 202 in accordance with an aspect of the present invention.

FIG. 8 describes an example of method 800 for analyzing received video in accordance with the invention to reach decision of normal, frozen, or black status of video. Following is the decision algorithm using two analysis lines per image frame.

Figure 9:
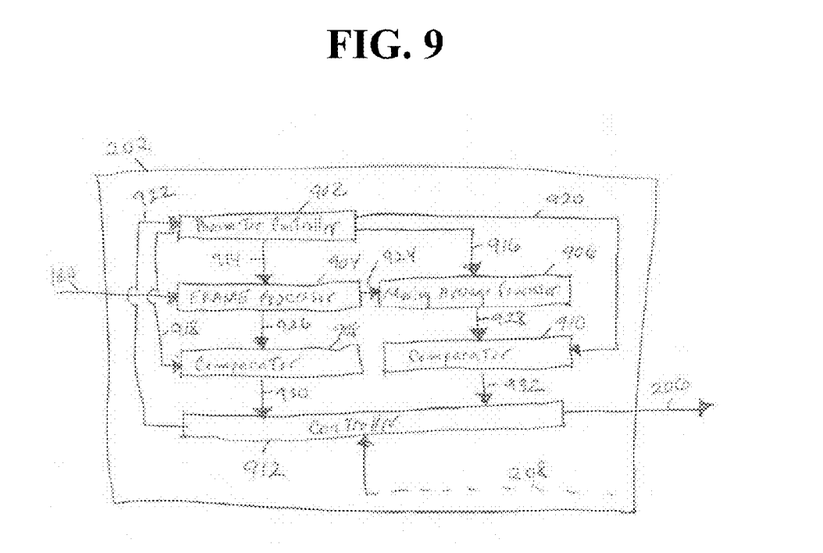
FIG. 9 illustrates an example video analyzer in accordance with an aspect of the present invention.

As illustrated in FIG. 9, video analyzer 202 includes a parameter controller 902, a frame processor 904, a moving-average processor 906, a comparator 908, a comparator 910 and a controller 912. In some embodiments, each of parameter controller 902, frame processor 904, moving-average processor 906, comparator 908, comparator 910 and controller 912 may be an independent device. In other embodiments, at least one of parameter controller 902, frame processor 904, moving-average processor 906, comparator 908, comparator 910 and controller 912 are combined. In some embodiments all of parameter controller 902, frame processor 904, moving-average processor 906, comparator 908, comparator 910 and controller 912 are combined as a single unitary device. For purposes of explanation, the operation of video analyzer 202 will include parameter controller 902, frame processor 904, moving-average processor 906, comparator 908, comparator 910 and controller 912 as separate devices.

Parameter controller 902 is arranged to output a signal 914, a signal 916, a signal 918 and a signal 920 and to receive a signal 922. Frame processor 904 is arranged to receive signal 130 and signal 914 and to output a signal 924 and a signal 926. Moving-average processor 906 is arranged to receive signal 916 and signal 924 and to output a signal 928. Comparator 908 is arranged to receive signal 918 and signal 926 and to output a signal 930. Comparator 910 is arranged to receive signal 920 and signal 928 and to output a signal 932. Controller 912 is arranged to output signal 206 and signal 922 and to receive signal 930 and signal 932.

In operation, example method 800 of processing a received video stream starts (S802) and the control parameters are set (S804). By way of parameter controller 902, the parameter to be analyzed may be set, non-limiting examples of which include intensity, chromatic information and combinations thereof. Further, by way of frame processor 902, the portion of an image frame to be analyzed may be set, non-limiting examples of which include an integer number of horizontal lines, an integer number of vertical lines, a section of the image frame or combination thereof.

Controller 912 may instruct parameter controller 902 by way of signal 922 to set the threshold integer P, of which P consecutive frames must be determined to be black before an indication is provided that a portion of the video stream is likely unintentionally black. Parameter controller 902 may then pass threshold integer P to comparator 908, by way of signal 918.

Controller 912 may instruct parameter controller 902 by way of signal 922 to set the window size M of the moving-average. Parameter controller 902 may then pass the window size M of the moving-average to moving-average processor 906, by way of signal 916.

Controller 912 may instruct parameter controller 902 by way of signal 922 to set the threshold values for $S_{black}$ and $S_{snow}$. Parameter controller 902 may then pass the threshold values for $S_{black}$ and $S_{snow}$ to comparator 908, by way of signal 918.

Controller 912 may instruct parameter controller 902 by way of signal 922 to set the threshold value $\delta_{max}$. Parameter controller 902 may then pass the threshold value for $\delta_{max}$ to comparator 910, by way of signal 920.

Presume for the sake of discussion, that the parameter to be analyzed is intensity and chromatic information having a value Q, the portion of an image frame to be analyzed is two horizontal lines of pixel data, threshold integer P is set to three (3), and window size M is set to three (3).

Next, video analyzer 202 receives a first image frame within a video stream (S806). Take for example video stream 300. In such a case, frame processor 904 receives data corresponding to image frame 302 from frame buffer 110 by way of signal 130.

Next, the image frame is analyzed (S808).

Video analyzer 202 determines whether the received image frame is black, snowy or is a duplicate of a previously received frame. Frame processor 904 analyzes the predetermined parameter of the portion of the image frame. In this example, as discussed above, the parameter to be analyzed is intensity and chromatic information having a value Q, and the portion of an image frame to be analyzed is two horizontal lines of pixel data, the threshold integer P is set to three (3), and the window size M is set to three (3).

Taking for example image frame 302, frame processor 904 determines the sum of the intensity and chromatic information value Q for line 314 and line 316 using equation (1) discussed above. Frame processor 904 provides a copy of the sum of the intensity and chromatic information value Q for line 314 and line 316 to moving-average processor 906 by way of signal 924. Moving-average processor 906 computes an average of the sum of the intensity and chromatic information value Q. In this situation, the average is based on data from a single frame, frame 302.

Frame processor 904 provides the sum of the intensity and chromatic information value Q for line 314 and line 316 to comparator 908 by way of signal 926. Comparator 908 compares the sum of the intensity and chromatic information value Q for line 314 and line 316 to $S_{black}$ and $S_{snow}$ and sends the results of the comparison to controller 912 by way of signal 930.

Moving-average processor 906 provides the average of the sum of the intensity and chromatic information value Q to comparator 910 by way of signal 928. Comparator 910 compares the average of the sum of the intensity and chromatic information value Q of the current image frame (in this example image frame 302) to the average of the sum of the intensity and chromatic information value Q of the previously analyzed image frame (in this example, there is no previously analyzed image frame) to obtain a change in the averages, $\delta_{ave}$. Comparator 910 then determines the difference between $\delta_{ave}$ and $\delta_{max}$.

Returning to FIG. 8, method 800 then determines whether there is a problem with the received video stream based on at least the most recently received image frame (S810).

Controller 912 determines whether the received image frame is black or snowy based on the results of the comparison from comparator 908 and determines whether the received image frame is identical, or sufficiently similar to, the previously received image frame from comparator 910. In the case of image frame 302, 912 would determine that image frame is not black, is not snowy and is not identical, or sufficiently similar to, the previously received image frame.

Even if controller 912 were to determine that a frame is black or snowy, such a determination may not be sufficient to warrant an indication of a problem. Specifically, as indicated previously, there may be situations where a video stream intentionally includes a black or snowy frame. To account for such situations controller 912 uses threshold integer P before providing an indication that a portion of the video stream is likely to be problematic. In this example, threshold integer P is set to three (3). Accordingly, a single image frame that is determined to be black or snowy would not trigger controller 912 to provide an indication of a problem.

Returning to FIG. 8, if a problem is not determined in step S810 then it is then determined whether the last processed image frame is the last image frame in the video stream (S812). If the last processed image frame is the last image frame in the video stream, then method 800 stops (S820). If the last processed image frame is not the last image frame in the video stream, then method 800 receives data corresponding to the next image frame in the video stream (S806).

Returning to step S810, if it is determined that there is a problem, then it is determined whether the video stream is frozen (S814). With reference to video stream 400 of FIG. 4, moving-average processor 906 would have determined that the moving-average $\delta_{ave}$ of image frames 410, 408 and 406 is less than $\delta_{max}$. Controller 912 would therefore determine that video stream 400 is frozen and provide an indication of such by way of signal 206 (S816).

If it is determined that the video stream is not frozen, then it is determined whether a portion of the video stream has turned black (S818). With reference to video stream 500 of FIG. 5, comparator 908 would have determined that the sum of the intensity and chromatic information value Q for frame 512 is less than $S_{black}$. Controller 912 would therefore determine that video stream 500 is black and provide an indication of such by way of signal 206 (S820). With reference to video stream 600 of FIG. 6, comparator 908 would have determined that the sum of the intensity and chromatic information value Q for frame 512 is more than $S_{black}$ but less than $S_{snow}$. Controller 912 would therefore determine that video stream 600 is snowy and provide an indication of such by way of signal 206 (S822).

In example method 800 discussed above, a determination of whether a video stream is frozen is performed prior to a determination of whether the video stream is black/frozen. However, as the two determinations are based on different parameters, in other embodiments, the determination of whether a video stream is frozen may be performed after the determination of whether the video stream is black/frozen. Further, in other embodiments, the determination of whether a video stream is frozen may be performed concurrently with the determination of whether the video stream is black/frozen.

In accordance with an aspect of the present invention, the effectiveness of the video analyzer is highly scalable; it can be tuned to the right processing requirements. In another embodiment, user interface 204 may adjust parameters of video analyzer 202 by way of a signal 208. As illustrated in FIG. 9, signal 208 may be used to instruct controller 912 to change at least one of: the parameter to be analyzed; the portion of an image frame to be analyzed; the threshold integer P; the window size M of the moving-average; and the threshold values for $S_{black}$, $S_{snow}$ and $\delta_{max}$.

Signal 208 may be used to instruct controller 912 to change the parameter to be analyzed from intensity and chromatic information having a value Q to e.g., just intensity information or just chromatic information.

Signal 208 may be used to instruct controller 912 to change the portion of an image frame to be analyzed: from a first portion of the image frame, e.g., a single horizontal line of pixels, to a second portion of the image frame, e.g., two horizontal lines of pixels; from a first location of the image frame, e.g., the right upper quadrant of the image frame, to a second location of the image frame, e.g., the left lower quadrant of the image frame. Increasing the size of the portion of the image frame to be analyzed will increase the likelihood of determining a problem in the video stream but will additionally increase required processing resources. Alternatively, decreasing the size of the portion of the image frame to be analyzed will decrease the likelihood of determining a problem in the video stream but will additionally decrease required processing resources.

Signal 208 may be used to instruct controller 912 to decrease the value of the threshold parameter P, which will increase the speed in detecting whether the video stream has turned black or snowy but will increase the likelihood of indicating that the video stream has turned black or snowy when the portion of the video stream is intentionally black or snowy. Signal 208 may be used to instruct controller 912 to increase the value of the threshold parameter P, which will decrease the speed in detecting whether the video stream has turned black or snowy but will decrease the likelihood of indicating that the video stream has turned black or snowy when the portion of the video stream is intentionally black or snowy.

Signal 208 may be used to instruct controller 912 to change the value of the window size M to a new value V. In the case where V<M, the speed of determining that the video stream is frozen will increase whereas the likelihood of incorrectly determining that the video stream is frozen will additionally increase. In the case where V>M, the speed of determining that the video stream is frozen will decrease whereas the likelihood of incorrectly determining that the video stream is frozen will additionally decrease.

Signal 208 may be used to instruct controller 912 to increase the threshold values for $S_{black}$, $S_{snow}$ and $\delta_{max}$, which will increase the likelihood of correctly determining that a video stream is black, snowy or frozen but will additionally increase the likelihood of incorrectly determining that a video stream is not black, snowy or frozen. Similarly, signal 208 may be used to instruct controller 912 to decrease the threshold values for $S_{black}$, $S_{snow}$ and $\delta_{max}$, which will decrease the likelihood of correctly determining that a video stream is black, snowy or frozen but will additionally decrease the likelihood of incorrectly determining that a video stream is not black, snowy or frozen.

In the above-discussed example embodiments, a black or snowy portion of a video stream may be detected by analyzing a signal image frame, whereas a frozen portion of the video stream may be detected by analyzing a moving average of a plurality of image frames. In other example embodiments, a black, snowy or frozen portion of the video stream may be detected by analyzing a moving average of a plurality of image frames. For the sake of brevity, a discussion of the differences between these other example embodiments will be discussed below.

In accordance with another aspect of the present invention, in a manner similar to detecting a frozen portion of the video stream as discussed above, a black portion of the video stream may be detected. For example, the parameter of the portion of image frame data may be compared to a moving-average of similar portions of image frame data of a predetermined integer M subsequent image frames. This averaging over multiple image frames may be compared with a predetermined threshold to determine whether a portion of the video is black, thus indicating that the video stream may have been interrupted.

Let a change in the value of a parameter for corresponding portions of a predetermined number of consecutive image frames, i.e., a window size M of a moving-average, respectively, be $\delta_{av}$. For analysis purposes, a black portion of a video stream may be detected by determining whether $\delta_{av}$ is less than a predetermined threshold, $\delta_{max}$.

For example, suppose a parameter is intensity and chromatic information and suppose an analyzed portion is a horizontal line of pixels within an image frame. Further, suppose for example, that that the window size of the moving-average M is three (3). Finally, in this example, suppose the first three image frames are different, but the last three image frames are black. As will be further explained below, three successive image frames are analyzed to establish an average. From then on, each successive image frame is analyzed against to determine a new average of itself and the preceding two image frames.

In the above discussed example, the intensity and chromatic information of a single corresponding horizontal line of pixels is analyzed for the first image frame. The average value of the horizontal line of pixels for the first image frame determined (in this case, since there is only one value, the average is the value).

When the intensity and chromatic information of the corresponding horizontal line of pixels is analyzed for the second image frame. The average value of the horizontal line of pixels for the first image frame and the second image frame is determined. Then the absolute value of the average change, $|\delta_{av}|$, between the average value of the horizontal line of pixels for the first image frame and the second image frame and the average value of the horizontal line of pixels for the first image frame is determined. In this example, the absolute value of the average change, $|\delta_{av}|$, is greater than predetermined threshold, $\delta_{bmax}$.

Then, the intensity and chromatic information of a single corresponding horizontal line of pixels is analyzed for the third image frame. The average value of the horizontal line of pixels for the first, second and third image frames is determined. Then the average change, $\delta_{av}$, between the average value of the horizontal line of pixels for the first, second and third image frames and the average value of the horizontal line of pixels for the first image frame and the second image frame is determined. In this example, the absolute value of the average change, $|\delta_{av}|$, is greater than predetermined threshold, $\delta_{bmax}$.

Then, the intensity and chromatic information of a single corresponding horizontal line of pixels is analyzed for the fourth image frame. Now, since window size of the moving-average M is three (3), the value of the horizontal line of pixels for the first image frame is not used. Accordingly, the average value of the horizontal line of pixels for the second, third and fourth image frames is determined. Then the absolute value of the average change, $|\delta_{av}|$, between the average value of the horizontal line of pixels for the first through third image frames and the average value of the horizontal line of pixels for the second through fourth image frames is determined. Presume in this example that the second image frame and the third image frame are sufficiently different from a black image frame that the absolute value of the average change, $|\delta_{av}|$, is greater than predetermined threshold, $\delta_{bmax}$.

Then, the intensity and chromatic information of a single corresponding horizontal line of pixels is analyzed for the fifth image frame. Now, since window size of the moving-average M is three (3), the value of the horizontal line of pixels for the first image frame and the second image frame are not used. Accordingly, the average value of the horizontal line of pixels for the third, fourth and fifth image frames is determined. Then the absolute value of the average change, $|\delta_{av}|$, between the average value of the horizontal line of pixels for the second through fourth image frames and the average value of the horizontal line of pixels for the third through fifth image frames is determined. Now, presume in this example that the third image frame is sufficiently different from a black image frame that the absolute value of the average change, $|\delta_{av}|$, is greater than predetermined threshold, $\delta_{bmax}$.

Then, the intensity and chromatic information of a single corresponding horizontal line of pixels is analyzed for the sixth image frame. Now, since window size of the moving-average M is three (3), the value of the horizontal line of pixels for the first through third image frames are not used. Accordingly, the average value of the horizontal line of pixels for the fourth, fifth and sixth image frames is determined. Then the absolute value of the average change, $|\delta_{av}|$, between the average value of the horizontal line of pixels for the third through fifth image frames and the average value of the horizontal line of pixels for the fourth through sixth image frames is determined. Now, the absolute value of the average change, $|\delta_{av}|$, is be less than the predetermined threshold, $\delta_{bmax}$. Accordingly, in this case, the portion of the video will be determined to be black.

In accordance with another aspect of the present invention, in a manner similar to detecting a frozen portion of the video stream as discussed above, a snowy portion of the video stream may be detected. For example, the parameter of the portion of image frame data may be compared to a moving-average of similar portions of image frame data of a predetermined integer M subsequent image frames. This averaging over multiple image frames may be compared with a predetermined threshold to determine whether a portion of the video is snowy, thus indicating that the video stream may have been interrupted or may be too replete with interference to process the data.

Let a change in the value of a parameter for corresponding portions of a predetermined number of consecutive image frames, i.e., a window size M of a moving-average, respectively, be $\delta_{av}$. For analysis purposes, a snowy portion of a video stream may be detected by determining whether $\delta_{av}$ is greater than $\delta_{bmax}$, but is less than a predetermined threshold, $\delta_{smax}$.

For example, suppose a parameter is intensity and chromatic information and suppose an analyzed portion is a horizontal line of pixels within an image frame. Further, suppose for example, that that the window size of the moving-average M is three (3). Finally, in this example, suppose the first three image frames are different, but the last three image frames are snowy. As will be further explained below, three successive image frames are analyzed to establish an average. From then on, each successive image frame is analyzed against to determine a new average of itself and the preceding two image frames.

In the above discussed example, the intensity and chromatic information of a single corresponding horizontal line of pixels is analyzed for the first image frame. The average value of the horizontal line of pixels for the first image frame determined (in this case, since there is only one value, the average is the value).

When the intensity and chromatic information of the corresponding horizontal line of pixels is analyzed for the second image frame. The average value of the horizontal line of pixels for the first image frame and the second image frame is determined. Then the absolute value of the average change, $|\delta_{av}|$, between the average value of the horizontal line of pixels for the first image frame and the second image frame and the average value of the horizontal line of pixels for the first image frame is determined. In this example, the absolute value of the average change, $|\delta_{av}|$, is greater than predetermined threshold, $\delta_{smax}$.

Then, the intensity and chromatic information of a single corresponding horizontal line of pixels is analyzed for the third image frame. The average value of the horizontal line of pixels for the first, second and third image frames is determined. Then the average change, $\delta_{av}$, between the average value of the horizontal line of pixels for the first, second and third image frames and the average value of the horizontal line of pixels for the first image frame and the second image frame is determined. In this example, the absolute value of the average change, $|\delta_{av}|$, is greater than predetermined threshold, $\delta_{smax}$.

Then, the intensity and chromatic information of a single corresponding horizontal line of pixels is analyzed for the fourth image frame. Now, since window size of the moving-average M is three (3), the value of the horizontal line of pixels for the first image frame is not used. Accordingly, the average value of the horizontal line of pixels for the second, third and fourth image frames is determined. Then the absolute value of the average change, $|\delta_{av}|$, between the average value of the horizontal line of pixels for the first through third image frames and the average value of the horizontal line of pixels for the second through fourth image frames is determined. Presume in this example that the second image frame and the third image frame are sufficiently different from a snowy image frame that the absolute value of the average change, $|\delta_{av}|$, is greater than predetermined threshold, $\delta_{smax}$.

Then, the intensity and chromatic information of a single corresponding horizontal line of pixels is analyzed for the fifth image frame. Now, since window size of the moving-average M is three (3), the value of the horizontal line of pixels for the first image frame and the second image frame are not used. Accordingly, the average value of the horizontal line of pixels for the third, fourth and fifth image frames is determined. Then the absolute value of the average change, $|\delta_{av}|$, between the average value of the horizontal line of pixels for the second through fourth image frames and the average value of the horizontal line of pixels for the third through fifth image frames is determined. Now, presume in this example that the third image frame is sufficiently different from a snowy image frame that the absolute value of the average change, $|\delta_{av}|$, is greater than predetermined threshold, $\delta_{smax}$.

Then, the intensity and chromatic information of a single corresponding horizontal line of pixels is analyzed for the sixth image frame. Now, since window size of the moving-average M is three (3), the value of the horizontal line of pixels for the first through third image frames are not used. Accordingly, the average value of the horizontal line of pixels for the fourth, fifth and sixth image frames is determined. Then the absolute value of the average change, $|\delta_{av}|$, between the average value of the horizontal line of pixels for the third through fifth image frames and the average value of the horizontal line of pixels for the fourth through sixth image frames is determined. Now, the absolute value of the average change, $|\delta_{av}|$, will be greater than the predetermined threshold, $\delta_{bmax}$, so the portion of the video stream will not be determined to be black. However, the absolute value of the average change, $|\delta_{av}|$, will be less than the predetermined threshold, $\delta_{smax}$. Accordingly, in this case, the portion of the video will be determined to be snowy.

The example embodiments discussed above, which are able to detect a black, snowy or frozen portion of a video stream using a moving average, may be implemented by a modified version of the video analyzer of FIG. 9. For example, comparator 908 would not be needed. Further, comparator 910 may be modified to process the absolute value of the average change, $|\delta_{av}|$, with reference to the predetermined thresholds, $\delta_{max}$, $\delta_{bmax}$ and $\delta_{smax}$. Still further, signal 208 may be used to instruct controller 912 to change the threshold values for $\delta_{max}$, $\delta_{bmax}$ and $\delta_{smax}$.

As discussed above, aspects of the present invention provide a mechanism to detect problems in a video stream, wherein the mechanism is low in complexity and is highly scalable. The mechanism can detect black, frozen or snowy portions of a video stream without analyzing entire image frames.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A method of analyzing a video stream using a video analyzer, the video stream comprising image frame data corresponding to an integer N number of image frames, respectively, the video analyzer comprising a controller and a frame processor, said method comprising:

setting, by way of the controller, a problem threshold value corresponding to a parameter of the image frame data, wherein said setting a problem threshold value corresponding to a parameter of the image frame data comprises setting an interrupted threshold value;

receiving, by way of the frame processor, first image frame data corresponding to a first image frame;

analyzing, by way of the frame processor, the parameter of a portion of the received first image frame data and generating an analyzed value;

determining that there is a problem when the analyzed value is less than the interrupted threshold value; and generating, via the controller, an indication of a black or snowy image when the problem is determined, wherein the portion of the analyzed portion of the received first image frame data is less than the total received first image frame data.

2. The method of claim 1, wherein said setting a problem threshold value comprises changing the problem threshold value from a first problem threshold value to a second problem threshold value.

3. The method of claim 1, wherein said analyzing the parameter of a portion of the received first image frame data comprises analyzing the parameter of a first portion of the received first image frame data and a second portion of the first image frame data.

4. The method of claim 1, wherein said analyzing the parameter of a portion of the received first image frame data comprises analyzing the parameter of a line of pixels of the received first image frame data.

5. The method of claim 4, wherein said analyzing the parameter of a line of pixels of the received first image frame data comprises analyzing the parameter of a vertical line of pixels of the received first image frame data.

6. The method of claim 4, wherein said analyzing the parameter of a line of pixels of the received first image frame data comprises analyzing the parameter of a horizontal line of pixels of the received first image frame data.

7. The method of claim 1, wherein said analyzing the parameter of a portion of the received first image frame data comprises analyzing the parameter of a group of pixels of the received first image frame data.

8. The method of claim 1, further comprising:
receiving, by way of the frame processor, second image frame data corresponding to a second image frame;
analyzing, by way of the frame processor, the parameter of a portion of the received second image frame data and generating a second analyzed value;
receiving, by way of the frame processor, third image frame data corresponding to a third image frame;
analyzing, by way of the frame processor, the parameter of a portion of the received third image frame data and generating a third analyzed value; and
generating a first average analyzed value based on the analyzed value and the second analyzed value; and
generating a second average analyzed value based on the analyzed value, the second analyzed value and the third analyzed value;
wherein said setting a problem threshold value corresponding to a parameter of the image frame data comprises setting an average change threshold, and
wherein said determining whether there is a problem based on the analyzed value and the problem threshold value comprises determining whether there is a problem based on the average change threshold, the first average analyzed value and the second average analyzed value.

9. The method of claim 8, further comprising:
changing a window size of a moving-average window from a first window size to a second window size,
wherein said determining whether there is a problem based on the average change threshold, the first average analyzed value and the second average analyzed value comprises a moving-average computation using the moving-average window.

10. The method of claim 8, further comprising changing the average change threshold from a first average change threshold to a second average change threshold.

11. The method of claim 1, wherein said setting an interrupted threshold value comprises setting a snowy threshold value, Ssnow, and setting a black threshold value, Sblack, wherein Sblack<Ssnow, wherein said determining that there is a problem when the analyzed value is less than the interrupted threshold value comprises determining that there is a problem when the analyzed value is less than Ssnow and is greater than Sblack, and wherein said generating an indication of a black or snowy image when a problem is determined comprises generating an indication of a snowy image.

12. The method of claim 1, wherein said setting an interrupted threshold value comprises setting a black threshold value, Sblack, wherein said determining that there is a problem when the analyzed value is less than the interrupted threshold value comprises determining that there is a problem when the analyzed value is less than Sblack, and
wherein said generating an indication of a black or snowy image when a problem is determined comprises generating an indication of a black image.

13. The method of claim 1, further comprising changing the interrupted threshold value from a first interrupted threshold value to a second interrupted threshold value.

14. A video analyzer for use with image frame data, which corresponds to an integer N number of image frames, respectively, said video analyzer comprising:
a frame processor operable to process a portion of image frame data corresponding to a portion of one of the integer N number of image frames and to output an image frame data output signal;
a comparator operable to compare the image frame data output signal with a predetermined threshold and to output a compared signal; and
a controller operable to output a first indicator signal based on the compared signal, wherein the portion of the one of the integer N number of image frames is less than the entire one of the integer N number of image frames, wherein the first indicator signal corresponds to a problem in the image frame data when the compared signal corresponds to the image frame data output signal being less than the predetermined threshold, and
wherein the first indicator signal corresponds to no problem in the image frame data when the compared signal corresponds to the image frame data output signal being more than the predetermined threshold; and
wherein said frame processor is further operable to process a second portion of image frame data of the one of the integer N number of image frames, and
wherein the portion of image frame data of the one of the integer N number of image frames is not equal to the second portion of image frame data of the one of the integer N number of image frames.

15. The video analyzer of claim 14, further comprising:
a moving-average processor operable to process a moving-average of image frame data of up to an integer M number corresponding to up to integer M number of image frames, respectively, and to output a moving-average output signal; and
a second comparator operable to compare the moving-average output signal with a second predetermined threshold and to output a second compared signal, wherein said controller is further operable to output a second indicator signal based on the second compared signal,
wherein the second indicator signal corresponds to a problem in the image frame data when the second compared signal corresponds to the moving-average data output signal being less than the second predetermined threshold, and
wherein the second indicator signal corresponds to no problem in the image frame data when the second compared signal corresponds to the moving-average data output signal being more than the second predetermined threshold.

16. The video analyzer of claim 15, wherein said frame processor is operable to process the portion of image frame data of the one of the integer N number of image frames as a spatial portion of the image frame data of the one of the integer N number of image frames.

17. The video analyzer of claim 16, wherein said frame processor is operable to process the portion of image frame data of the one of the integer N number of image frames as a line of data corresponding to a line of pixels of the image frame data of the one of the integer N number of image frames.

18. A video analyzer for use with image frame data, which corresponds to an integer N number of image frames, respectively, said video analyzer comprising:

a frame processor operable to process a portion of image frame data corresponding to a portion of one of the integer N number of image frames and to output an image frame data output signal;

a moving-average processor operable to process a moving-average of image frame data of up to an integer M number corresponding to up to integer M number of image frames, respectively, and to output a moving-average output signal;

a comparator operable to compare the moving-average output signal with a predetermined threshold and to output a compared signal; and a controller operable to output an indicator signal based on the compared signal, wherein the portion of the one of the integer N number of image frames is less than the entire one of the integer N number of image frames, wherein the indicator signal corresponds to a problem in the image frame data when the compared signal corresponds to the moving-average data output signal being less than the predetermined threshold, and wherein the indicator signal corresponds to no problem in the image frame data when the compared signal corresponds to the moving-average data output signal being more than the predetermined threshold.

* * * * *